US012775376B2

(12) United States Patent
Mccolgan et al.

(10) Patent No.: US 12,775,376 B2
(45) **Date of Patent: *Oct. 27, 2026**

(54) INTENT AND TARGET DETERMINATION FOR DIGITAL HANDWRITING INPUT

(71) Applicant: Microsoft Technology Licensing, LLC, Redmond, WA (US)

(72) Inventors: Haley Mccolgan, Seattle, WA (US); John C. Whytock, Eatonville, WA (US); Roland Radtke, Brier, WA (US); Nathan P. Pollock, Woodinville, WA (US); Parthasarathy Sundararajan, Bothell, WA (US); Elizabeth Todaro, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/240,687

(22) Filed: Jun. 17, 2025

(65) Prior Publication Data

US 2025/0306754 A1 Oct. 2, 2025

Related U.S. Application Data

(63) Continuation of application No. 18/132,717, filed on Apr. 10, 2023, now Pat. No. 12,360,660.

(51) Int. Cl.
*G06F 3/04883* (2022.01)
*G06F 3/0489* (2022.01)

(52) U.S. Cl.
CPC ........ *G06F 3/04883* (2013.01); *G06F 3/0489* (2013.01)

(58) Field of Classification Search
CPC ................. G06F 3/0488–04886; G06F 3/0489
See application file for complete search history.

(56) References Cited

U.S. PATENT DOCUMENTS

| | | | | |
|---|---|---|---|---|
| 2003/0071850 | A1* | 4/2003 | Geidl | G06F 3/04883 715/781 |
| 2022/0413637 | A1* | 12/2022 | Wu | G06F 3/03545 |

OTHER PUBLICATIONS

International Preliminary Report on Patentability (Chapter I) received for PCT Application No. PCT/US2024/021251, mailed on Oct. 23, 2025, 18 pages.

* cited by examiner

*Primary Examiner* — David Tung

(57) ABSTRACT

Pen input received by a computing device may first be evaluated to determine an associated intent. For example, it may be determined whether it is intended to be handwriting input, in which case the pen input may be intercepted (e.g., rather than provided to an underlying application for further processing). Subsequently, a target determination is made, where the pen input is processed to determine which input field should receive the input. When the pen input is processed to generate handwriting input, context associated with a determined input field may be used to improve recognition accuracy. Finally, various techniques may be used to ultimately provide the handwriting input to the determined input field, for example according to the set of capabilities that is supported by an application associated with the input field. Similarly, aspects of the disclosed system may be disabled or adapted when the application does not support such functionality.

20 Claims, 8 Drawing Sheets

INTENT AND TARGET DETERMINATION FOR DIGITAL HANDWRITING INPUT

CROSS-REFERENCES TO RELATED APPLICATIONS

This application is a continuation of U.S. patent application Ser. No. 18/132,717, filed on Apr. 10, 2023, the disclosure of which is hereby incorporated by reference in its entirety.

BACKGROUND

In instances where a pen device or stylus is used to provide input to a computing device, it may be difficult to determine a user intent associated with such pen input. For instance, it may be difficult to determine whether the user intends to provide handwriting input, intends to apply a pen gesture, or intends to actuate a user interface element, among other example input. Additionally, in instances where the user provides handwriting input, it may be difficult to determine an intended target application and/or associated input field to which the input is to be provided. These and other detriments may result in user frustration and, ultimately, in a diminished user experience.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to intent and target determination for digital handwriting input. In examples, pen input received by a computing device is first evaluated to determine an intent associated with the pen input. For example, it may be determined whether the pen input is intended to be handwriting input. If it is determined that the pen input is intended to be handwriting input, the pen input may be intercepted. However, if it is determined that the pen input is not intended to be handwriting input, the pen input may instead be provided to an underlying application (e.g., underlying a region in which the pen input was received) for further processing.

In instances where the pen input is intercepted (e.g., when the pen input is determined to be handwriting input), a target determination for the pen input may be made, where the pen input is further processed to determine which user interface input field is to receive the input. Additionally, when the pen input is processed to generate handwriting input, context associated with a determined user interface input field may be used to improve recognition accuracy. Finally, various techniques may be used to ultimately input the handwriting input into the determined user interface input field, for example according to the set of capabilities that is supported by an application associated with the input field. Similarly, certain aspects of the disclosed handwriting input system may be adapted according to such capabilities, for example to disable text replacement and/or text deletion via handwriting input when the application does not support such functionality.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
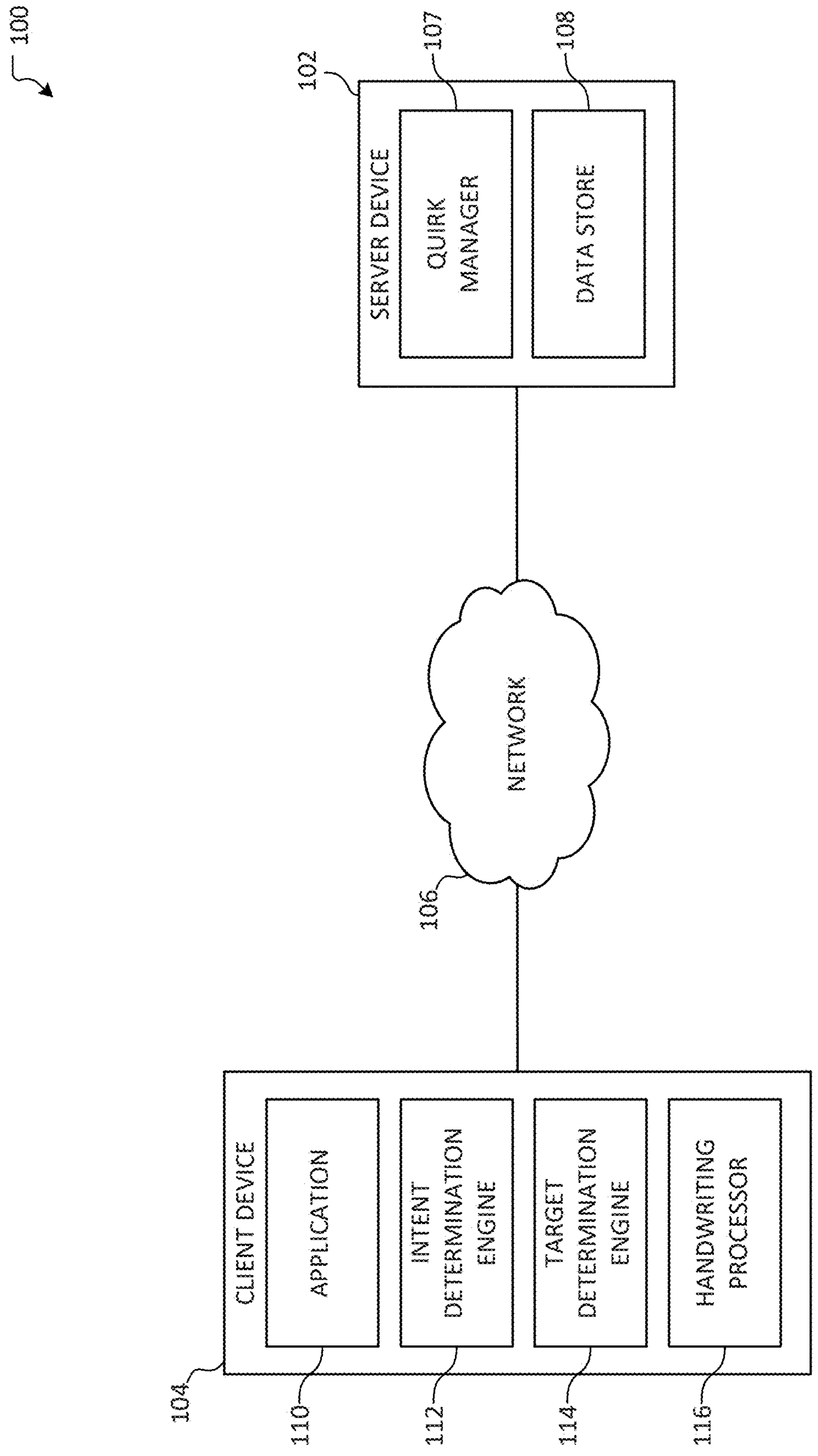
FIG. 1 illustrates an overview of an example system for intent and target determination for digital handwriting input according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a user provides handwriting input to a computing device using a digital pen or a stylus, among other such input devices. However, in instances where the pen is usable to provide other inputs (e.g., when the pen acts as a pointing device, a touch input device, or a gesturing device to actuate a user element, scroll, and/or reposition content), it may be difficult to determine which input is intended by the user. Further, even if pen input is correctly identified as handwriting input, it may be difficult to determine which input field or other user interface element is the intended target of the handwriting input, as may be the case for a user interface that includes multiple input fields that each may receive handwriting input. Other techniques to resolve these and other issues may introduce additional complexity to the handwriting user experience offered by a computing device. For example, an initial pen input received by the device may first cause the display of an interstitial window, which may then be specifically used to receive handwriting input. As another example, various applications may each implement varying degrees of pen input functionality, which may lead to an inconsistent or unpredictable user experience.

Accordingly, aspects of the present disclosure relate to intent and target determination for digital handwriting input. In examples, pen input received by a computing device is first evaluated to determine an intent associated with the pen input. For example, it may be determined whether the pen input is intended to be handwriting input. If it is determined that the pen input is intended to be handwriting input, the pen input may be intercepted. However, if it is determined that the pen input is not intended to be handwriting input, the pen input may instead be provided to an underlying application (e.g., underlying a region in which the pen input was received) for further processing.

In instances where the pen input is intercepted (e.g., when the pen input is determined to be handwriting input), a target determination for the pen input may be made, where the pen input is further processed to determine which user interface input field is to receive the input. Additionally, when the pen input is processed to generate handwriting input, context associated with a determined user interface input field may be used to improve recognition accuracy. Finally, various techniques may be used to ultimately input the handwriting input into the determined user interface input field, for example according to the set of capabilities that is supported by an application associated with the input field. Similarly, certain aspects of the disclosed handwriting input system may be adapted according to such capabilities, for example to disable text replacement and/or text deletion via handwriting input when the application does not support such functionality.

As noted above, a user intent determination is made for pen input to determine whether the pen input is intended to be handwriting input. While examples are described herein with respect to handwriting input and an associated intent to provide the handwriting input, it will be appreciated that similar techniques may be used to intercept any of a variety of other input (e.g., associated with any of a variety of other intents), including, but not limited to, pen input for content selection, pen input for system-level control, pen input for system-level gestures, and/or pen input for taking a note or providing an annotation, among other examples. In examples where the pen input is determined to be handwriting input (and/or any of a variety of other inputs, in other examples), the pen input is intercepted and further processed according to aspects described herein.

An intent determination may be made based on any of a variety of factors, including, but not limited to, proximity to a user interface input field (e.g., based on the start and/or end of the pen input), whether an application and/or editable input field is beneath a region corresponding to the received pen input, whether an input stroke of the pen input comprises a movement or gesture as compared to a tap, a speed with which the pen input was provided by a user, a pressure of the pen input (e.g., a pen input having reduced pressure may indicate that the input is not intended to be handwriting input, or vice versa), a shape of an input stroke of the pen input, and/or timing associated with the input stroke. As used herein, an input field may be a field in which content may be inserted, edited, and/or removed by a user, among other examples. For instance, an input field may be a text box or text area of a web browser, a word processor, a spreadsheet application, an email and/or calendaring application, or other application, as well as a canvas of an image editing application, among other examples.

In examples, the intent determination is made based on one or more other factors in addition to, or as an alternative to, factors associated with the pen input, such as whether the user actuated an input control on the pen device to manually indicate an intent to provide handwriting input and/or based on context relating to one or more of the displayed applications. Further, as is discussed in greater detail below, a machine learning model may alternatively, or additionally, process the pen input and an associated context (e.g., relating to one or more such factors) to generate an intent determination accordingly. Thus, it will be appreciated that any of a variety of techniques and associated factors may be used to determine user intent associated with pen input according to aspects described herein.

Similarly, an application programming interface (API) may be provided via which at least a part of the user intent determination may additionally, or alternatively, be delegated to or otherwise informed by one or more applications of the computing device. For example, an application associated with pen input may be identified and an API may be used to obtain information about one or more user interface elements for which pen input may be received. As another example, the application may be provided an indication of the received pen input, such that the application can determine whether the pen input is intended to be handwriting input or other input accordingly. One or more such indications may then be further evaluated according to the described aspects when determining whether to intercept pen input that is intended to be handwriting input (and/or other input, in other examples).

In instances where it is determined not to intercept pen input (e.g., where it is determined that the pen input is not intended to be handwriting input), the input may instead be provided to an underlying application associated with the pen input (e.g., that is present in a region in which the pen input was received), thereby enabling the application to further process the pen input accordingly. Thus, pen input may be buffered while a user intent determination is made, after which the pen input is either subsequently processed according to aspects described herein or is provided to the underlying application for further processing.

Prior to determining the associated user intent, pre-determination graphical feedback may be displayed to provide an indication that the pen input is received and is being processed by the computing device. For example, input strokes received from a user may be displayed with transparency and/or with muted or different colors to indicate that the input has been received but that an associated intent has not yet been determined (e.g., whether the input is intended to be handwriting input or other input). While examples of pre-determination feedback are provided, it will be appreciated that any of a variety of alternative or additional feedback may be provided to a user to indicate that the pen input has been received but not yet processed.

Once the user intent determination has been made, pre-determination graphical feedback may transition to or otherwise be replaced by post-determination graphical feedback. Example post-determination graphical feedback includes, but is not limited to, one or more input strokes having increased opacity and/or a darkened color as compared to that of pre-determination graphical feedback. In examples, the post-determination graphical feedback depends on the determined user intent. For instance, if it was determined not to intercept the pen input, the post-determination graphical feedback may be generated by the application to which the pen input was provided.

As another example, if the pen input is determined to be handwriting input, the post-determination graphical feedback may include a set of splines corresponding to a set of input strokes of the pen input. As a further example, the post-determination graphical feedback may comprise one or more recognized letters. In instances where the pen input is determined to be for content selection, the post-determination graphical feedback may include a "lasso" effect, where a selected area is indicated using a dashed and/or moving line. It will therefore be appreciated that any of a variety of post-determination graphical feedback may be used to indicate to a user that an intent determination has been made accordingly (e.g., after displaying pre-determination graphical feedback).

Once it is determined that the pen input is intended to be handwriting input (or, in other examples, any of a variety of other input), a further determination as to a target of the pen input is made. In examples, the target determination is made toward the beginning of the pen input (e.g., during or after a first input stroke, and/or within a predetermined time period). In some examples, the target determination may be updated while additional pen input is received (e.g., in response to one or more subsequent input strokes or periodically according to a time interval). For example, an intended target may become increasingly more evident (e.g., until it exceeds a predetermined threshold) as additional pen input is received.

Similar factors may be used as were discussed above with respect to the intent determination. For example, such factors include, but are not limited to, where the pen input started, where the pen input ended, what application(s) correspond to a region of the pen input, which application previously received user input, and/or where was user input previously received. In examples, an input field may provide an indication as to an expected content type, which may additionally, or alternatively, be used to select among a plurality of candidate input fields. For instance, if the pen input comprises numeric handwriting input, a target input field may be selected that indicates numeric input is expected. As another example, if the pen input is determined to include a uniform resource locator (URL), a date, or an address, a target input field may be selected that indicates URL input, address input, or date input, respectively, is expected.

Similar to the above-noted API, an API may be provided via which an application may provide an indication relating to how the application is constructed. For instance, the application may be a multiwindow application, such that the API is used to provide an indication as to which windows are associated with the application, which windows may receive handwriting input, and/or which windows should be ignored as part of a target determination, among other examples. Thus, as compared to single-windowed applications, such an API may enable a multiwindowed application to provide additional information that is processed as part of the target determination according to aspects described herein.

Additionally, or alternatively, a machine learning model may process the pen input and an associated context (e.g., including screenshots of a region close to the input, prior history, user input patterns, and/or one or more such factors) to generate a target determination accordingly, as is discussed in greater detail below. Thus, it will be appreciated that any of a variety of techniques and associated factors may be used to determine a target associated with pen input according to aspects described herein.

In some instances, pen input may be associated with multiple candidate user interface input fields, as may be the case when a region of the pen input overlaps with or is otherwise proximate to multiple regions that each correspond with a candidate user interface input field. Accordingly, the disclosed aspects may select a target input field from a plurality of candidate input fields (e.g., based on an expected content type, one or more input fields that have already been completed, and/or one or more input fields that have yet to receive user input). In some instances, a confidence level for multiple candidate input fields may be similar and/or no associated confidence levels may exceed a predetermined threshold. In such instances, confirmation as to an intended target input field may be requested from the user. In other instances, pen input may ultimately be split across multiple input fields, as may be the case when a user provides pen input for multiple input fields (e.g., as may be the case when authoring an email having "to," "subject," and "message body" input fields or when authoring multiple cells of a spreadsheet).

Once one or more target input fields are determined, a graphical indication may be presented to the user. For example, the target input field(s) may receive input focus, such that a graphical indication of the input focus is provided accordingly. Additionally, or alternatively, the target input field(s) may be processed to determine whether there is preexisting content within a target input field, which may be updated, replaced, or otherwise edited as a result of the received pen input. It will be appreciated that any of a variety of alternative or additional operations may be performed as a result of determining a target input field according to aspects described herein.

While examples have been described herein with respect to user interface input fields, it will be appreciated that similar techniques may be used for any of a variety of other user interface elements. For instance, a button or other user interface element may be declared as a handwriting input target, such that pen input associated with the button or other user interface element is processed as handwriting input accordingly. In such an example, the handwriting input may ultimately invoke an action (e.g., as a result of a user writing on a menu, an action within the menu may be invoked) or may be used to store the handwriting input (e.g., as a note, as a file, as a reminder, as a task, or as an appointment) accordingly. As a further example, user input over an application window (e.g., a larger region than a constituent input field) may be processed to perform an action. For instance, pen input of an "S" over an email may cause the email to be sent or pen input of a "Q" over an application window may cause the application to quit. It will therefore be appreciated that pen input to any of a variety of such user interface elements may be processed according to the disclosed aspects.

As a result of determining one or more targets for the pen input, handwriting recognition accuracy may be improved based on context from the determined target input field(s). For example, if it is determined that the target input field expects numeric input, the pen input may be processed to generate handwriting input with a bias toward recognizing input strokes as numeric input. Similarly, if it is determined that the target input field expects an email address, the pen input may be processed to generate handwriting input in view of contact information in a corporate directory and/or the user's contact list. It will therefore be appreciated that any of a variety of contextual information may be used to improve handwriting recognition accuracy according to aspects described herein, including, but not limited to, a custom spelling dictionary, a global or personal contacts list, or a list of running/installed applications, among other examples.

Once handwriting input is generated for the received pen input for insertion into the determined target input field(s), any of a variety of techniques may be used to provide the handwriting input into the target input field(s) accordingly. In examples, different applications may each support a potentially different set of input techniques, such that providing handwriting input may vary from application to application. Accordingly, various techniques may be ranked, such that a first input technique may be preferable as compared to a second input technique, while the second input technique may be preferable as compared to a third input technique. Thus, when providing input to a target input field of an application, the first input technique may be used if it is available, while the second input technique may be used if the first input technique is not available. Similarly, the third input technique may be used if the first input technique and the second input technique are not available.

As an example, an operating system of the computing device may provide a text services framework, which may be the first input technique (e.g., that which is most preferred). As another example, the operating system may provide a user interface automation API, which may be the second input technique (e.g., that which is second most preferred as compared to the first input technique). As a further example, simulated keyboard input may be provided via the kernel of the computing device, which may be the third input technique (e.g., that which is third most preferred, after the first and second input techniques). While example input techniques and an associated ranking are described, it will be appreciated that any of a variety of alternative or additional input techniques may be used in other examples.

In addition to and, in examples as a result of, the variety of input techniques that may be available for a given application, a "quirks" system may be used, where application-specific idiosyncrasies are managed and used to adapt the user experience that is provided according to the aspects described herein. For instance, if an application exhibits suboptimal behavior (e.g., unexpected, unreliable, and/or unstable behavior), certain features that may otherwise be available for handwriting input may be disabled or may otherwise be changed in a way that improves the associated user experience. As an example, if an input technique for an application doesn't permit text replacement, the ability to scratch out existing content and replace the content via pen input may be disabled. As another example, if it is determined that an application routinely incorrectly reports regions at which user interface input fields are located and/or associated expected content types are incorrect, the quirks system may be used to adapt or otherwise override the information that is reported by the application accordingly. Such quirks may be centrally managed, such that updates to a quirks library (e.g., quirk additions, modifications, and/or removals) may be pushed to client devices accordingly. As another example, one or more quirks may be user-specified or may be otherwise generated locally by the client computing device, among other examples.

As noted above, a machine learning model may be used for intent determination and/or for target determination. In examples, a machine learning model is trained to identify user interface input fields (e.g., from a screenshot of a computing device), such that the machine learning model generates a set of regions corresponding to identified user interface input fields that is used to make an intent and/or target determination accordingly. Additionally, or alternatively, the machine learning model may be trained to identify regions for which handwriting input is unlikely to be received, such that input received at such regions may be classified to not exhibit user intent to provide handwriting input. In some instances, the machine learning model may additionally, or alternatively, be trained to generate an expected type of content for one or more input fields of the user interface.

As another example, the machine learning model may additionally, or alternatively, be trained to process pen input (e.g., as may be defined by one or more input coordinates, tilt, and/or pressure) in relation to such user interface input fields, among any of a variety of additional or alternative contextual information, to characterize the intent of pen input accordingly. As a further example, pen input corresponding to full word and/or sentence input in association with an intended target input field may be used to train the machine learning model to identify a target input field accordingly.

The same or a different machine learning model may similarly be trained to make a target determination according to aspects described herein. For example, the same machine learning model may determine a user intent and may further identify one or more target input fields. As another example, a first machine learning model determines the user intent, while a second machine learning model identifies the target input field(s).

It will be appreciated that such machine learning models may be generalized for a population of users, may be specific to a subset of users, or may be user-specific, among other examples. For example, a machine learning model used for intent determination may be associated with the locale of the computing device, as differences may exist between right-to-left and left-to-right languages. As another example, a machine learning model used for target determination may be finetuned for a given user, as users may exhibit different behaviors that are useful for resolving pen input that is ambiguous with respect to a plurality of input fields. Similarly, a machine learning model may be used for handwriting recognition, which may, in some examples, be tuned for a specific user.

As such, it will be appreciated that the disclosed aspects enable a system to make a determination as to user intent and target input field(s) associated with pen input prior to and, in some examples, even in the absence of processing by such an application (and a pen input processing pipeline associated therewith). The disclosed aspects may therefore enable an improved and/or more consistent user experience for providing pen input to applications of a computing device, as may especially be the case for applications that have not been designed for pen input or applications that have not been updated to take advantage of modern device and/or software functionality associated with pen input. Further, it will be appreciated that the disclosed aspects enable handwriting input processing even in instances where the target input field is not one of a foreground application or even if at least a part of the input field is obscured, among other examples. As another example, the disclosed aspects result in reduced computing resource utilization, as a computing system implementing the disclosed aspects may act on a user's intent more quickly and/or more accurately, thereby reducing or avoiding unnecessary execution attempts and/or confirmations, among other examples.

FIG. 1 illustrates an overview of an example system 100 for intent and target determination for digital handwriting input according to aspects described herein. As illustrated, system 100 includes server device 102, client device 104, and network 106. In examples, server device 102 and client device 104 communicate via network 106, which may comprise a local area network, a wireless network, or the Internet, or any combination thereof, among other examples.

Client device 104 may be any of a variety of computing devices, including, but not limited to, a tablet computing device, a mobile computing device, a laptop computing device, or a desktop computing device, among other examples. As illustrated, client device 104 includes application 110, intent determination engine 112, target determination engine 114, and handwriting processor 116. In examples, pen input is received by client device 104 as a result of a user interacting with a display of client device 104 using a pen device or a stylus, among other examples.

In examples, the pen input is received in a region of the display that corresponds to a window of application 110. Prior to providing an indication of the pen input to application 110, intent determination engine 112 determines a user intent associated with the pen input according to aspects described herein. Intent determination engine 112 may cause pre-determination graphical feedback to be displayed while determining an intent for the received pen input.

Intent determination engine 112 may evaluate the pen input according to a variety of factors (as was noted above) in relation to one or more input fields of application 110 and/or other user interface elements (e.g., of other applications and/or of an operating system executing thereon) that are displayed by client device 104. Once a user intent has been determined, post-determination graphical feedback may be displayed in place of the pre-determination feedback. If intent determination engine 112 determines the user intent is not to provide handwriting input (or, in other examples, is not to provide any of a variety of other input types), an indication of the received pen input is provided to application 110 for subsequent processing.

However, if intent determination engine 112 instead determines that the user intent is to provide handwriting input, target determination engine 114 further determines one or more target user interface input fields (e.g., of application 110) to which the pen input is directed. As noted above, the pen input may be evaluated according to a variety of factors in relation to one or more input fields of application 110 and/or other user interface elements (e.g., of other applications and/or of an operating system executing thereon) that are displayed by client device 104.

For example, a region of the pen input may be compared to regions of such input fields to determine an input field to which the pen input is directed. In instances where there is ambiguity, target determination engine 114 may request confirmation of a target input field from the user of client device 104. In other examples, target determination engine 114 may identify multiple target input fields according to aspects described herein. Further, it will be appreciated that identified target input fields need not be limited to the same application (e.g., application 110) and may instead be directed to input fields of multiple applications and/or of an operating system of client device 104, among other examples.

Handwriting processor 116 processes the received pen input to generate handwriting input therefrom. In examples, handwriting processor 116 evaluates target input field(s) that were identified by target determination engine 114 to determine an expected content type and/or other context and improve recognition accuracy accordingly. As noted above, any of a variety of additional or alternative context information may be used when performing handwriting recognition based on the identified input field(s) and/or the application(s) associated therewith (e.g., application 110), such as an associated custom spelling dictionary, corporate directory, or contact list, among other examples.

Handwriting processor 116 provides the generated handwriting input to application 110 according to aspects described herein. For example, the handwriting input may be provided using one or more input techniques that are supported by application 110. In examples, handwriting processor 116 uses a ranked set of input techniques, where a lower-ranked input technique is used as a fallback input technique in instances where a higher-ranked input technique is not available.

Application 110 may thus receive handwriting input as a result of a user's pen input, even in instances where application 110 has not been updated to take advantage of such functionality provided by client device 104. In some instances, application 110 implements an API through which application 110 may be involved in processing performed by intent determination engine 112 and/or target determination engine 114 according to aspects described herein. Further, as a result of intercepting the pen input and processing it according to aspects described herein, a more consistent user experience may be provided across applications of client device 104 as compared to instances where each application implements such aspects individually. In examples, application 110 still implements functionality relating to pen input that is received by client device 104, as pen input that is not identified as handwriting input (e.g., by intent determination engine 112) is still provided to application 110 for further processing.

System 100 is further illustrated as comprising server device 102. As illustrated, server device 102 includes quirk manager 107 and data store 108. Quirk manager 107 maintains a quirk library (e.g., as may be stored by data store 108) that addresses application-specific idiosyncrasies that may affect the accuracy with which intent determination engine 112 and/or target determination engine 114 process pen input according to aspects described herein. For example, the quirk library includes an entry for application 110, which may indicate that application 110 does not support certain pen input functionality. As a result, when intent determination engine 112 and/or target determination engine 114 are processing pen input associated with application 110 that is received at client device 104, the quirk library entry associated with application 110 may cause intent determination engine 112 and/or target determination engine 114 to process the pen input accordingly. For example, pen input that would be identified to invoke certain functionality when received in relation to a different application (not pictured) may be ignored or may be processed differently, among other examples.

In examples, server device 102 distributes the quirk library to client device 104 from data store 108 or client device 104 otherwise obtains the quirk library from server device 102 accordingly. While system 100 is illustrated as comprising one server device 102 and one client device 104, it will be appreciated that any number of devices may be used in other examples. For example, server device 102 may distribute a quirk library to any number of client devices.

Figure 2:
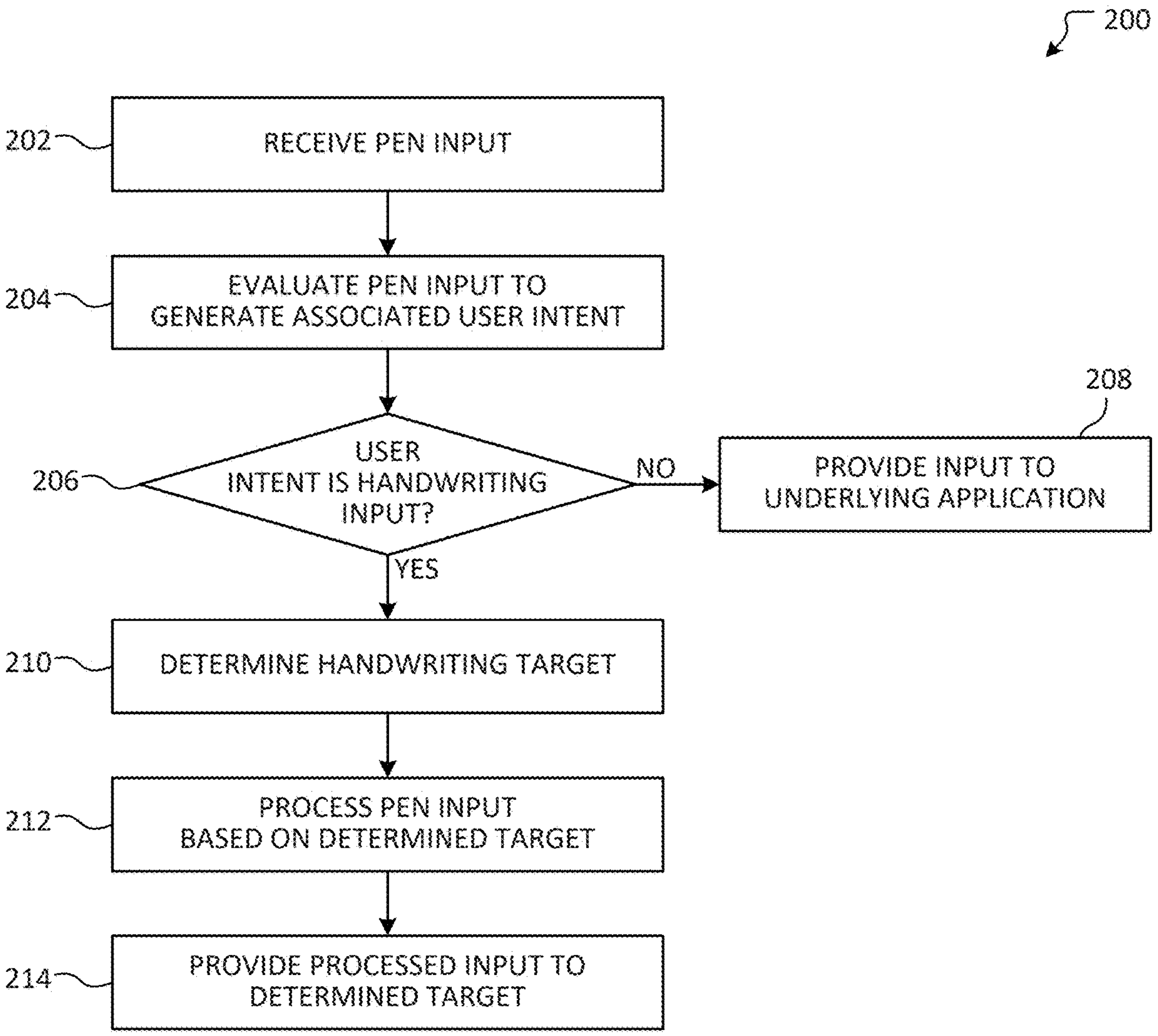
FIG. 2 illustrates an overview of an example method for processing pen input according to aspects described herein.

FIG. 2 illustrates an overview of an example method 200 for processing pen input according to aspects described herein. In examples, aspects of method 200 are performed by a computing device similar to client device 104 in FIG. 1.

As illustrated, method 200 begins at operation 202, where pen input is received. For example, the pen input is received as a result of a user interacting with a display of a computing device using a pen or a stylus, among other examples. In examples, the pen input includes handwriting input or includes touch input and/or input akin to that of a pointing device, among other examples. As noted above, similar techniques may be used to determine an intent associated with any of a variety of other inputs and need not be limited to handwriting input.

At operation 204, the pen input is evaluated to generate an associated user intent. Aspects of operation 204 may be performed by an intent determination engine, such as intent determination engine 112 in FIG. 1. Operation 204 may comprise evaluating a set of factors that relate to the pen input according to aspects described herein. For example, one or more rules are used to evaluate the set of factors and thus determine whether the pen input indicates that the user intends to provide handwriting input. Additionally, or alternatively, a machine learning model may be used to evaluate the set of factors and thus classify the pen input accordingly. Thus, it will be appreciated that any of a variety of techniques may be used to determine a user intent based on the received pen input according to aspects described herein. Additional examples of such aspects are discussed below with respect to method 300 in FIG. 3.

Flow progresses to determination 206, where it is determined whether the user intent is to provide handwriting input. Determination 206 is based on the user intent that was generated at operation 204. For example, operation 204 may generate a probability that the user intent is to provide handwriting input, such that determination 206 evaluates the probability according to a predetermined threshold. In some examples, an API may enable an application (e.g., as may have a user interface element corresponding to a region at which the pen input was received) to perform at least some of the processing associated with operation 204 and determination 206 as noted above.

If, at determination 206, it is determined that the user intent is not to provide handwriting input, flow branches "NO" to operation 208, where the pen input is provided to an underlying application (e.g., application 110 in FIG. 1) associated with a region at which the pen input was received. Thus, the pen input may be buffered while operations 202, 204, and 206 are performed, after which the pen input is provided from the buffer to the underlying application for subsequent processing by the application. In examples, operation 208 comprises providing subsequent input strokes to the application, as may be the case until the user concludes providing the pen input. Method 200 terminates at operation 208.

By contrast, if it is instead determined that the user intends to provide handwriting input, flow branches "YES" to operation 210, where a handwriting target is determined. Aspects of operation 210 may be performed by a target determination engine, such as target determination engine 114 in FIG. 1. As described above, one or more target user interface input fields may be determined based on a set of factors relating to the pen input that was received at operation 202 and one or more input fields that are displayed by the computing device. Similar to operation 204, a set of rules and/or a machine learning model may be used to evaluate such features and to thus determine a target input field to which the pen input is directed. In examples, operation 204 comprises evaluating an expected content type for an identified user interface input field based on a type for the pen input (e.g., as may be determined using handwriting recognition for the received pen input).

In instances where the pen input is determined to be ambiguous, such that there are multiple potential target input fields, user confirmation may be requested at operation 210, such that the user is presented with a selection between or among the potential target input fields. In such an example, the display may retain the pen input that has been received by the user and may further be updated to indicate the plurality of input fields that have been identified as potential input fields. The user may thus select one or more of the potential input fields after the user has finished providing input strokes or, as another example, the user may provide input to select one or more of the potential input fields and may then resume providing input strokes, among other examples. Additional examples of target determination aspects that may be performed at operation 210 are discussed below with respect to method 400 in FIG. 4.

Method 200 continues to operation 212, where the pen input is processed based on the target input field that was determined at operation 210. Aspects of operation 212 may be performed by a handwriting processor, such as handwriting processor 116 in FIG. 1. As noted above, handwriting recognition may be performed according to an expected content type, based on a user's custom spelling dictionary, based on contact information, and/or based on any of a variety of context that may be determined from the target input field that was determined at operation 210. Thus, as a result of determining the target for which the pen input was received, handwriting recognition accuracy may be improved accordingly.

In some examples, method 200 loops between operation 210 and 212, as may be the case when the handwriting target(s) is periodically or substantially continuously determined while user input is being received. In such an example, the determined target input field may change, which may further cause the recognized handwriting input to change as a result of the changed context associated with the new target input field.

Flow progresses to operation 214, where the processed handwriting input is provided to the target input filed that was determined at operation 210. Aspects of operation 214 may be performed by a handwriting processor, such as handwriting processor 116 in FIG. 1. As noted above, any of a variety of input techniques may be used to provide the handwriting input to the target input field. For example, a hierarchy of input techniques may be evaluated to determine the highest-rated input technique of the hierarchy that is supported by an application associated with the input field. Additional example aspects that may be performed at operations 212 and/or 214 are discussed below with respect to method 500 in FIG. 5. Further, while examples are described in which a single target input field is determined and handwriting input is provided thereto, it will be appreciated that similar aspects may be used to provide handwriting input to any number of target input fields in other examples. Method 200 terminates at operation 214.

Figure 3:
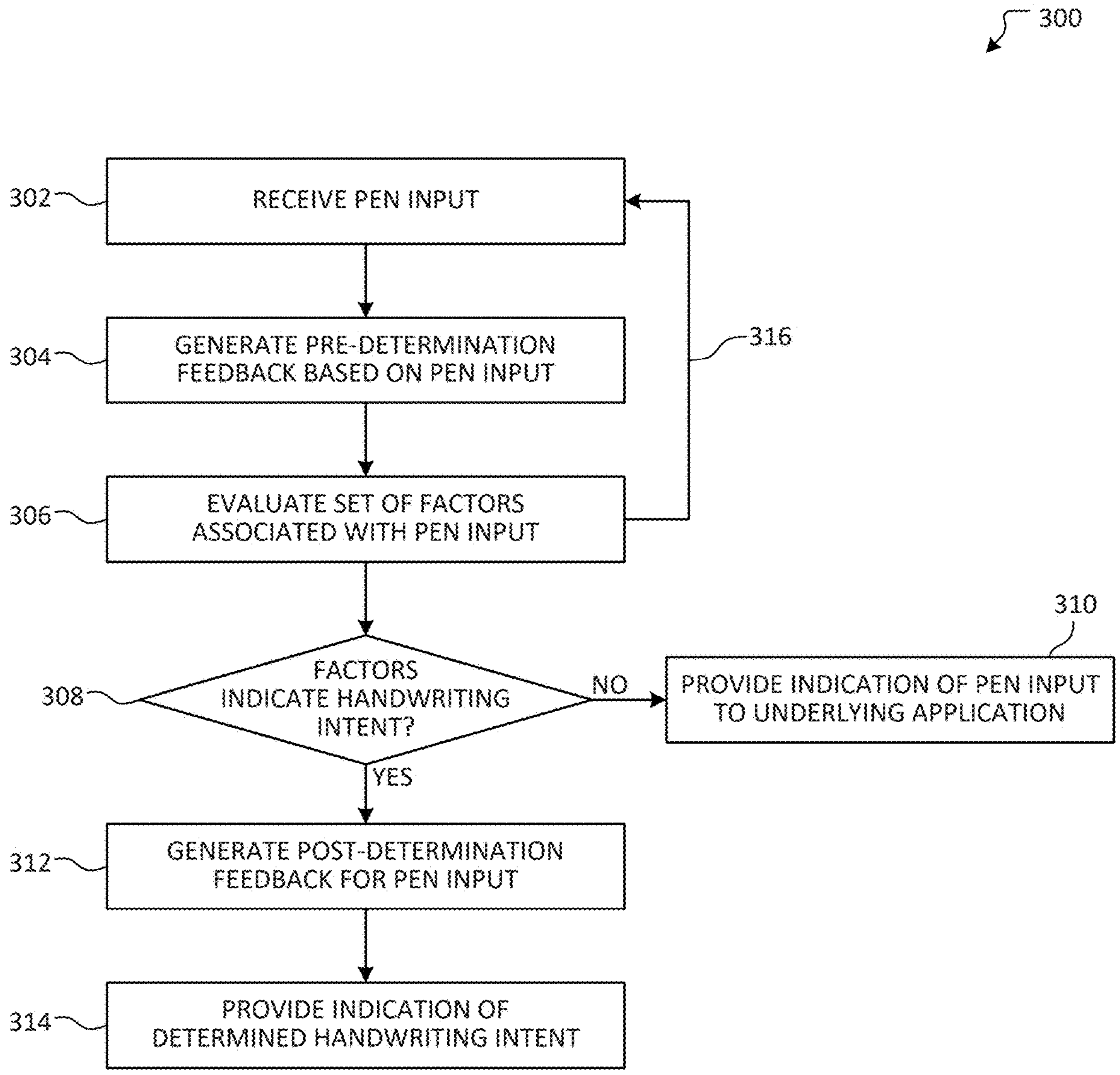
FIG. 3 illustrates an overview of an example method for determining a user intent based on received pen input according to aspects described herein.

FIG. 3 illustrates an overview of an example method 300 for determining a user intent based on received pen input according to aspects described herein. In examples, aspects of method 300 are performed by an intent determination engine, such as intent determination engine 112 in FIG. 1. As another example, aspects of method 300 may be performed as part of operation 204 discussed above with respect to method 200 in FIG. 2.

As illustrated, method 300 begins at operation 302, where pen input is received. For example, the pen input is received as a result of a user interacting with a display of a computing device using a pen or a stylus, among other examples. In examples, the pen input includes handwriting input or includes touch input and/or input akin to that of a pointing device, among other examples. As noted above, similar techniques may be used to determine an intent associated with any of a variety of other inputs and need not be limited to handwriting input.

Flow progresses to operation 304, where pre-determination feedback is generated based on the received pen input. For example, one or more input strokes of the received pen input may be displayed with transparency and/or with muted or different colors to indicate that the input has been received but has not yet been processed. In other examples, operation 302 additionally, or alternatively, comprises providing audio and/or haptic feedback. Thus, it will be appreciated that any of a variety of feedback may be provided to indicate that the pen input has been received but not yet processed. In other examples, operation 304 may be omitted such that pre-determination feedback is not generated (e.g., as may be the case when no feedback is provided prior to an intent determination or where the pen input is processed according to a first intent until it is determined that the pen input is instead associated with a second intent).

At operation 306, a set of factors associated with the pen input is evaluated. Example factors include, but are not limited to, proximity of the received pen input to a user interface input field, whether an application and/or editable input field is beneath a region corresponding to the received pen input, whether an input stroke of the pen input comprises a movement or gesture as compared to a tap, a speed with which the pen input was provided by a user, a pressure of the pen input, a shape of an input stroke, and/or timing associated with an input stroke of the pen input.

In some examples, operation 304 comprises evaluating one or more other factors in addition to or as an alternative to those associated with the pen input, such as whether an input control was actuated on the pen device with which the pen input was provided, such that the user may manually indicate an intent to provide handwriting input. As another example, context relating to one or more of the displayed applications may be evaluated, such as whether the application has an input field for which handwriting input may be received.

As was discussed above with respect to operation 204 of method 200 in FIG. 2, the set of factors may be evaluated according to a set of rules, one or more predetermined thresholds, and/or a machine learning model, among other examples, to characterize the user intent of the pen input accordingly. For example, as noted above, the machine learning model may be trained to identify user interface input fields and/or regions at which handwriting input is unlikely to be received, such that the machine learning model generates a set of regions corresponding to identified user interface input fields that is used to make an intent determination accordingly. As another example, the machine learning model may additionally, or alternatively, be trained to process pen input in relation to such user interface input fields to characterize the intent of pen input accordingly.

Method 300 progresses to determination 308, where it is determined whether the factors indicate a user intent to provide handwriting input. Similar to determination 206, determination 308 is based on the evaluation that was performed at operation 306. For example, operation 306 may generate a probability that the user intent is to provide handwriting input, such that determination 308 evaluates the probability according to a predetermined threshold.

Accordingly, if it is determined that the set of factors do not indicate an intent to provide handwriting input, method 300 branches "NO" to operation 310, where an indication of the pen input is provided to an underlying application (e.g., application 110 in FIG. 1) associated with a region at which the pen input was received at operation 302. Thus, the pen input may be buffered while operations 302, 304, 306, and 308 are performed, after which the pen input is provided from the buffer to the underlying application for subsequent processing by the application.

In examples, operation 310 comprises providing subsequent input strokes to the application, as may be the case until the user concludes providing the pen input. In another example, operation 310 comprises changing or removing the pre-determination feedback that was generated at operation 304. For example, the pre-determination graphical feedback may be removed to permit the underlying application to generate feedback for the pen input accordingly. Method 300 terminates at operation 310.

Returning to determination 308, if it is instead determined that the set of factors indicates user intent to provide handwriting input, flow branches "YES" to operation 312, where post-determination feedback is generated for the pen input. Example post-determination graphical feedback includes, but is not limited to, one or more input strokes having increased opacity and/or a darkened color as compared to the pre-determination graphical feedback that was generated at operation 304. In other examples, operation 312 additionally, or alternatively, comprises providing audio and/or haptic feedback. Thus, it will be appreciated that any of a variety of feedback may be provided to indicate that a handwriting intent has been determined for the received pen input.

Flow progresses to operation 314, where an indication of the determined handwriting intent is provided. For example, the indication may be provided to a target determination engine (e.g., target determination engine 114 in FIG. 1), such that subsequent processing of the pen input is performed. Examples of such aspects were discussed above with respect to operations 210-214 of method 200 in FIG. 2. Method 300 terminates at operation 314.

Figure 4:
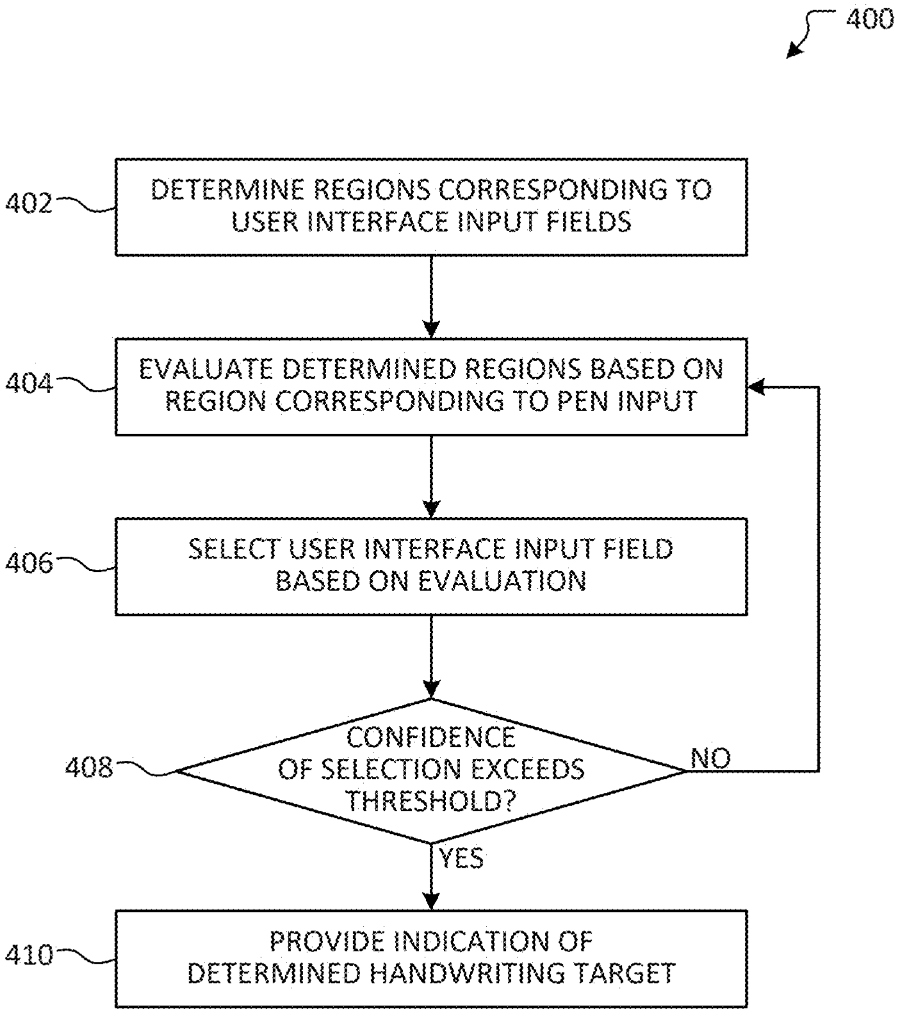
FIG. 4 illustrates an overview of an example method for determining a handwriting target based on received pen input according to aspects described herein.

FIG. 4 illustrates an overview of an example method 400 for determining a handwriting target based on received pen input according to aspects described herein. In examples, aspects of method 400 are performed by a target determination engine, such as target determination engine 114 in FIG. 1. As another example, aspects of method 400 may be performed as part of operation 210 discussed above with respect to method 200 in FIG. 2.

As illustrated, method 400 begins at operation 402, where a set of regions corresponding to user interface input fields is determined. In examples, the set of regions is determined based on a screenshot of the display of the computing device, which may be processed using a machine learning model according to aspects described herein. Additionally, or alternatively, a set of applications executing on the computing device may be processed to determine user interface input fields associated therewith. For example, a user interface framework used by an application may enable the determination of input fields that are currently displayed by the application, such that regions may be determined therefrom. It will therefore be appreciated that any of a variety of techniques may be used to determine a set of regions corresponding to user interface input fields according to aspects described herein.

Flow progresses to operation 404, where the determined set of regions for the user interface input fields is evaluated based on a region corresponding to the pen input. In examples, the region corresponding to the pen input is a bounding rectangle inside of which the received pen input fits. In other examples, multiple such bounding rectangles may be used, for example for one or more constituent input strokes for the pen input. It will be appreciated that rectangles are provided as example regions and that, in other examples, any of a variety of other regions/shapes may be used.

As noted above, the region of the pen input and the set of regions of the input fields may be evaluated according to a set of factors. Example factors include, but are not limited to, where the pen input started, where the pen input ended, what application(s) correspond to the region of the pen input, which application previously received user input, and/or where was user input previously received. As another example, an input field may provide an indication as to an expected content type, which may additionally, or alternatively, be used to select among a plurality of candidate input fields. For instance, a type of input may be determined for the pen input, such that an input field having a matching expected content type may be identified. Additionally, or alternatively, a machine learning model may be used to evaluate a word/sentence of the pen input and determine a user interface input field accordingly. In some instances, the machine learning model is used to perform aspects of both operation 402 and operation 404.

At operation 406, a user interface input field is selected based on the evaluation that was performed at operation 404. As an example, a probability score may be generated for each of the regions that was determined at operation 402, such that the set of regions may be ranked and the highest-ranked region may be selected at operation 406. As another example, a machine learning model that was used at operation 404 may generate an indication as to a specific user interface input field. In instances where ambiguity is identified, operation 406 may comprise prompting the user for a selection between or among a plurality of input fields. It will therefore be determined that any of a variety of techniques may be used to select a user interface input field according to aspects described herein. Further, as noted above, similar aspects may be used to select multiple target input fields in other examples.

At determination 408, it is determined whether the confidence for the selected input field(s) exceeds a predetermined threshold. For example, flow may branch "NO" and return to operation 404, such that aspects of method 400 are iteratively performed until a target input field is determined with a confidence that exceeds the predetermined threshold.

However, if the confidence level exceeds the predetermined threshold, flow instead branches "YES" to operation 410, where an indication of the determined handwriting target is provided. For example, the indication may be provided to a handwriting processor (e.g., handwriting processor 116 in FIG. 1), such that subsequent processing of the pen input is performed. Examples of such aspects were discussed above with respect to operations 212 and 214 of method 200 in FIG. 2. Method 400 terminates at operation 410.

Figure 5:
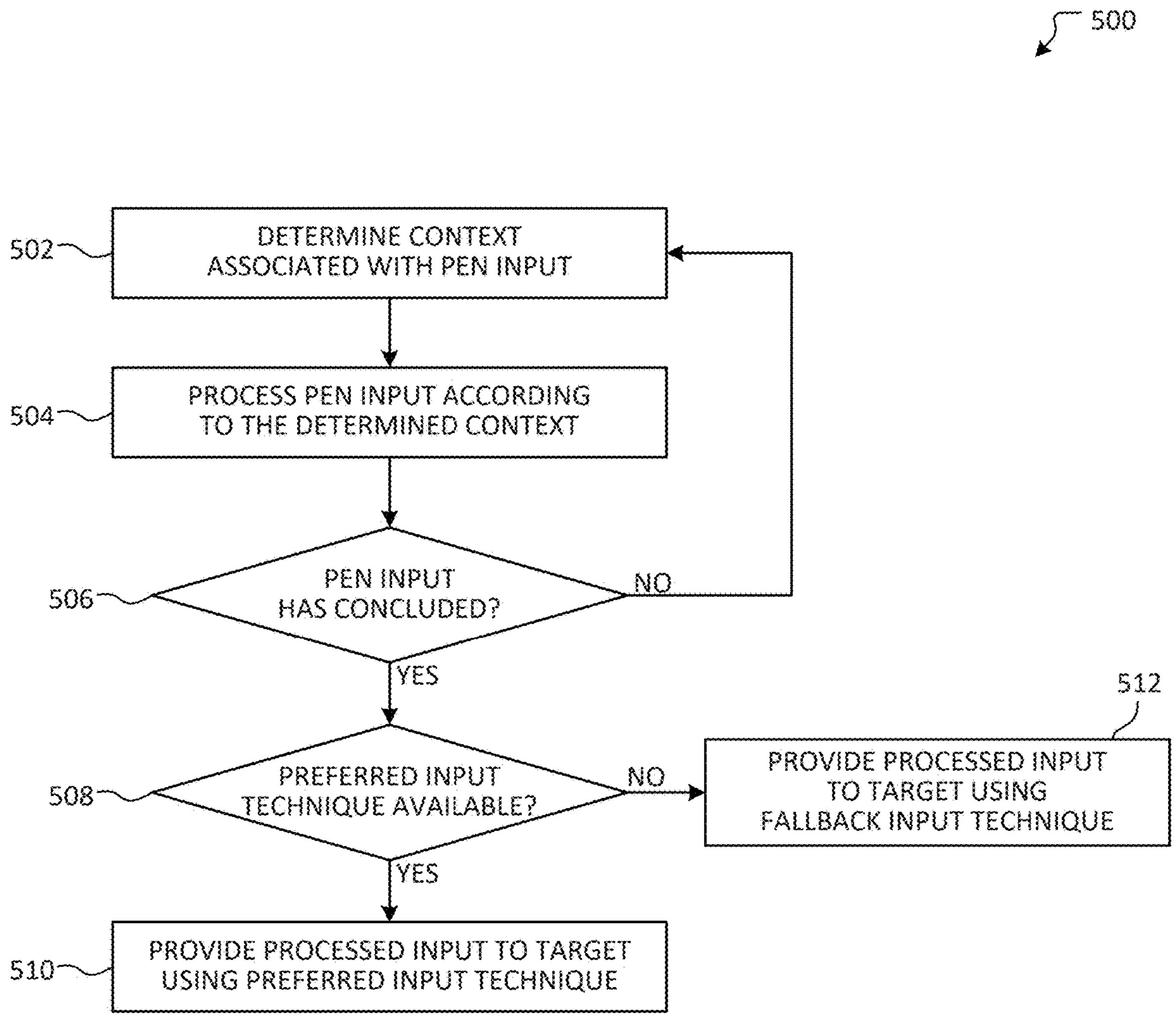
FIG. 5 illustrates an overview of an example method for processing handwriting input that is received as pen input according to aspects of the present disclosure.

FIG. 5 illustrates an overview of an example method 500 for processing handwriting input that is received as pen input according to aspects of the present disclosure. In examples, aspects of method 500 are performed by a handwriting processor, such as handwriting processor 116 in FIG. 1. As another example, aspects of method 500 may be performed as part of operation 212 and/or 214 discussed above with respect to method 200 in FIG. 2.

As illustrated, method 500 begins at operation 502, where a context associated with the pen input is determined. For example, the context may be determined based on one or more target input fields associated with the pen input, as may have been determined by a target determination engine (e.g., target determination engine 114 in FIG. 1) performing aspects of operation 210 of method 200 in FIG. 2 and/or aspects of method 400 in FIG. 4. The determined context may comprise an expected content type for the target input field and/or preexisting content of the input field. As another example, the determined context may include a user's custom spelling dictionary, a corporate directory, or a user's contact list, among other examples. In such an example, the context may thus include additional information that is usable to increase recognition accuracy for handwriting recognition. In some examples, an expected content type is generated for the input field using a machine learning model according to aspects described herein.

At operation 504, the pen input is processed according to the determined context to generate handwriting input. As a result of the determined context, handwriting input that is generated from the pen input may exhibit greater recognition accuracy. For example, recognized characters may be restricted to numeric input or may be recognized based on expected or otherwise known strings of characters that the user is likely to input (e.g., from a custom spelling dictionary, names, or email addresses). While example content types and associated recognition techniques are described, it will be appreciated that any of a variety of other techniques may be used to generate handwriting input according to aspects described herein.

Flow progresses to determination 506, where it is determined whether pen input has concluded. Thus, method 500 is illustrated as an example in which recognition occurs contemporaneously with pen input. It will be appreciated that, in other examples, at least a part of the processing described above with respect to operations 502 and 504 may be performed after pen input has concluded in other examples. In examples, it may be determined that pen input has concluded after a period of inactivity exceeds a predetermined threshold, based on a manual indication from the user, or after it is determined that the handwriting input is likely to be complete (e.g., the handwriting input comprises a valid email address or indicates that the user has moved to another target input field).

If it is determined that pen input has not concluded, flow branches "NO" and returns to operation 502, such that operations 502, 504, and 506 loop while pen input is being received. However, if it is instead determined that pen input has concluded, flow branches "YES" to determination 508, where it is determined whether a preferred input technique is available. For example, determination 508 comprises evaluating a set of capabilities for an application associated with the input field to which the pen input is targeted. In other examples, the preferred input technique may be attempted, where failure of the input attempt indicates that the preferred input technique is unavailable. It will therefore be appreciated that any of a variety of techniques may be used to determine which input techniques are available to provide the processed input.

If it is determined that the preferred input technique is available, flow branches "YES" to operation 510, where the processed input is provided to the target input field using the preferred input technique. By contrast, if it is instead determined that the preferred input technique is not available, flow branches "NO" to operation 512, where the processed input is provided to the target input field using a fallback input technique. Method 500 is illustrated as an example in which two input techniques are available, though it will be appreciated that similar aspects may be used for any number of input techniques. For example, a ranked set of input techniques may iteratively be evaluated until an input technique that is available is identified and used to ultimately provide the processed input accordingly. Method 500 terminates at operation 510 or 512.

Figure 6:
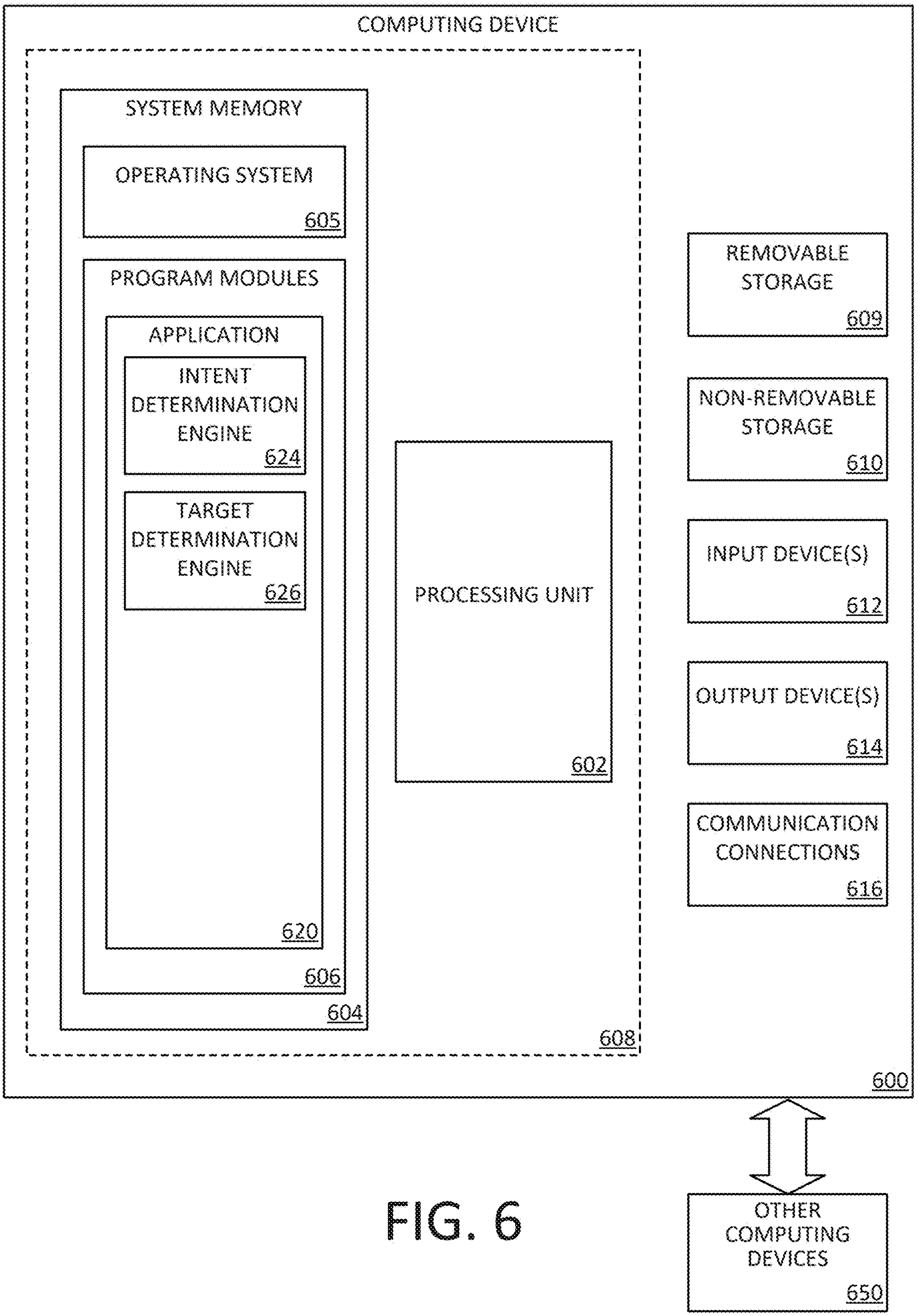
FIG. 6 is a block diagram illustrating example physical components of a computing device with which aspects of the disclosure may be practiced.
Figure 7:
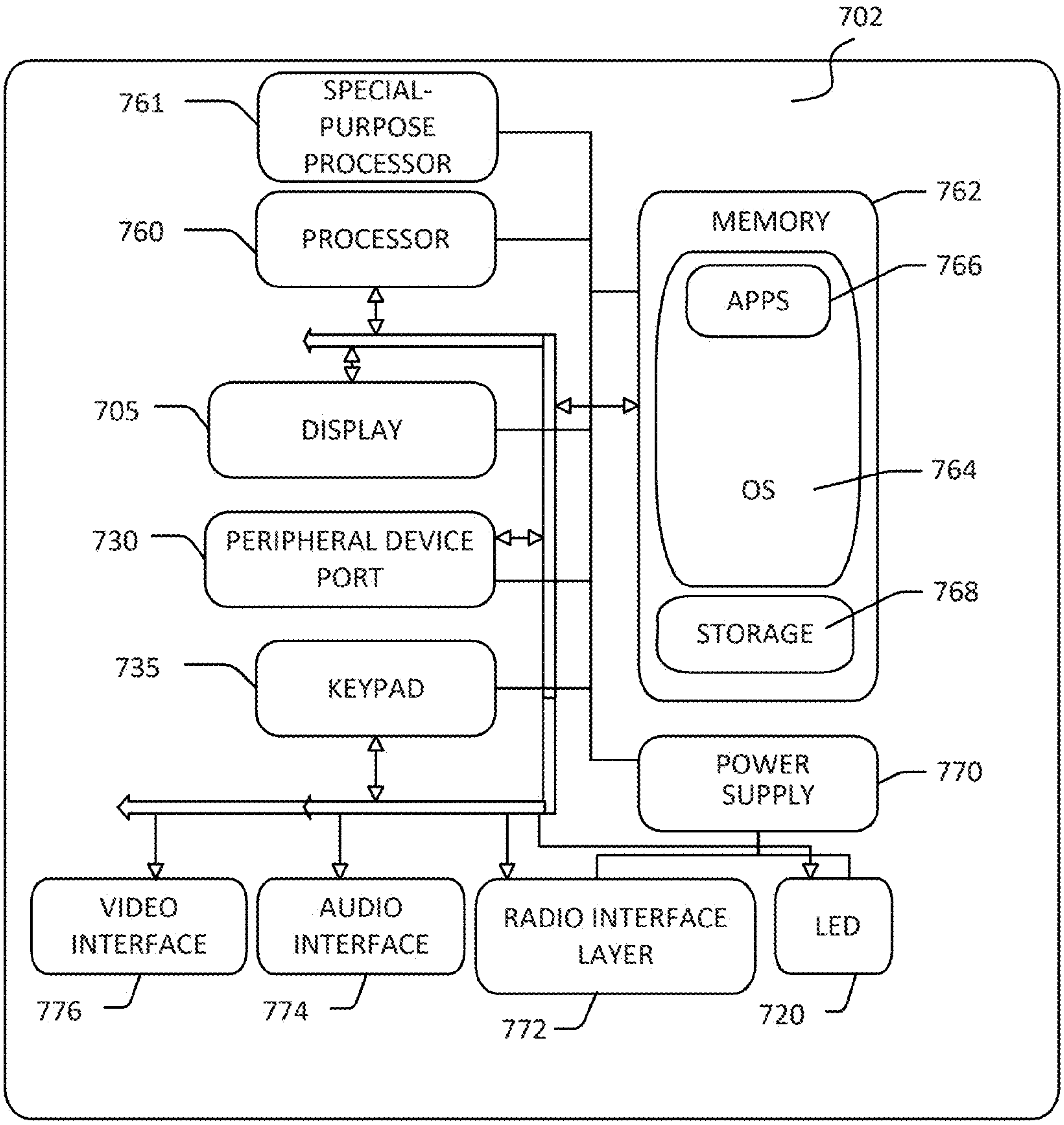
FIG. 7 is a simplified block diagram of a mobile computing device with which aspects of the present disclosure may be practiced.
Figure 8:
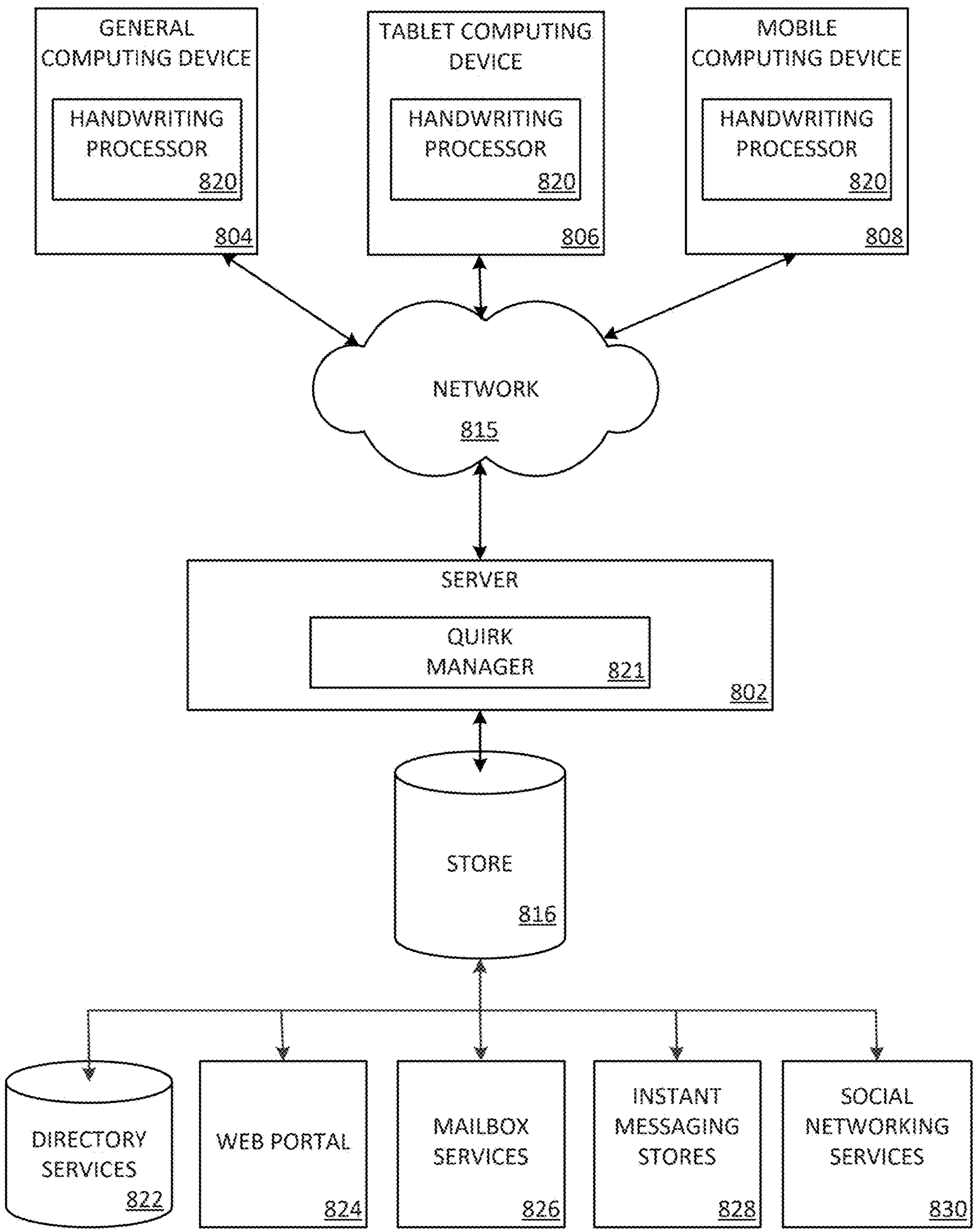
FIG. 8 is a simplified block diagram of a distributed computing system in which aspects of the present disclosure may be practiced.

FIGS. 6-8 and the associated description provides a discussion of an operating environment in which aspects of the disclosure may be practiced. However, illustrated aspects are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices described above, including devices 102 and 104 in FIG. 1. In examples, computing device 600 may be a mobile telephone, a smart phone, wearable computer (such as a smart watch), a tablet computer, a laptop computer, and the like, with which embodiments of the disclosure may be practiced. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store intent determination engine 624 and target determination engine 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 7 is a block diagram illustrating the architecture of one aspect of a computing device. That is, the computing device can incorporate a system (e.g., an architecture) 702 to implement some aspects. In some examples, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., an intent determination engine, a target determination engine, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and/or special-purpose processor 761 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of an on-board camera 730 to record still images, video stream, and the like.

A computing device implementing the system 702 may have additional features or functionality. For example, the computing device may also include additional data storage devices (removable and/or non-removable) such as, magnetic disks, optical disks, or tape. Such additional storage is illustrated in FIG. 7 by the non-volatile storage area 768.

Data/information generated or captured by the computing device and stored via the system 702 may be stored locally on the computing device, as described above, or the data may be stored on any number of storage media that may be accessed by the device via the radio interface layer 772 or via a wired connection between the computing device and a separate computing device associated with the computing device, for example, a server computer in a distributed computing network, such as the Internet. As should be appreciated such data/information may be accessed via the computing device via the radio interface layer 772 or via a distributed computing network. Similarly, such data/information may be readily transferred between computing devices for storage and use according to well-known data/information transfer and storage means, including electronic mail and collaborative data/information sharing systems.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

An application 820 (e.g., similar to the application 620) may be employed by a client that communicates with server device 802. Additionally, or alternatively, quirk manager 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

It will be appreciated that, as another example, a tablet computing device may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving pen input corresponding to a region of a display; determining a user intent for the pen input; when the user intent is determined to include a handwriting intent: processing the pen input to determine a target input field for the pen input, wherein the determined target input field is associated with the region of the display at which the pen input was received; generating, based on the pen input, handwriting input; and providing, to the target input field, the generated handwriting input. In an example, the set of operations further comprises: when the user intent is determined to not include the handwriting intent, providing, to an application associated with the region of the display, an indication of the pen input, thereby causing the application to process the pen input. In another example, the application associated with the region of the display includes the determined target input field. In a further example, determining the user intent for the pen input comprises: before the user intent is determined, displaying pre-determination graphical feedback; and after the user intent is determined, displaying post-determination graphical feedback. In yet another example, the handwriting input is generated based on a context of the determined target input field. In a further still example, providing the generated handwriting input to the target input field comprises: determining an input technique from a set of input techniques associated with the determined target input field; and providing the generated handwriting input to the target input field using the determined input technique. In another example, the set of input techniques comprises one or more of: a text services framework; a user interface automation application programming interface; or simulated keyboard input.

In another aspect, the technology relates to a method for processing digital handwriting input. The method comprises: receiving pen input corresponding to a region of a display; in response to receiving the pen input, generating pre-determination graphical feedback based on the received pen input; determining that a user intent for the pen input is a handwriting intent, thereby transitioning the pre-determination graphical feedback to post-determination graphical feedback; determining, from a set of user interface input fields of the display, a target input field that is associated with the region of the display at which the pen input was received; generating, based on a context associated with the target input field, handwriting input from the received pen input; and providing, to the target input field, the generated handwriting input. In an example, determining the user intent is the handwriting intent comprises evaluating the pen input using a machine learning model that is trained to classify pen input in relation to a set of displayed input fields. In another example, the pen input includes one or more points, each of which has at least one of an associated tilt or an associated pressure. In a further example, the set of user interface input fields is generated using a machine learning model trained to identify candidate user interface input fields. In yet another example, the machine learning model is further trained to generate an expected content type corresponding to each input field of the set of user interface input fields. In a further still example, providing the generated handwriting input to the target input field comprises: determining an input technique from a set of input techniques associated with the determined target input field; and providing the generated handwriting input to the target input field using the determined input technique. In another example, the set of input techniques comprises one or more of: a text services framework; a user interface automation application programming interface; or simulated keyboard input.

In a further aspect, the technology relates to another method for processing digital handwriting input. The method comprises: receiving a first instance of pen input; determining, for the first instance of pen input, a first user intent; when the first user intent is a handwriting intent: processing the first instance of pen input to determine a target input field for the first instance of pen input; generating, based on the first instance of pen input, handwriting input; and providing, to the target input field, the generated handwriting input; receiving a second instance of pen input corresponding to a region of a display; determining, for the second instance of pen input, a second user intent; and when the second user intent is not the handwriting intent: providing, to an application associated with the region of the display, an indication of the second instance of pen input, thereby causing the application to process the second instance of pen input. In an example, determining the first user intent for the first instance of pen input comprises: before the first user intent is determined, displaying pre-determination graphical feedback corresponding the first instance of pen input; and after the first user intent is determined, displaying post-determination graphical feedback. In another example, the handwriting input is generated based on a context of the determined target input field. In a further example, providing the generated handwriting input to the target input field comprises: determining an input technique from a set of input techniques associated with the determined target input field; and providing the generated handwriting input to the target input field using the determined input technique. In yet another example, the set of input techniques comprises one or more of: a text services framework; a user interface automation application programming interface; or simulated keyboard input. In a further still example, the region of the display is a second region of the display; the first instance of pen input is associated with a first region of the display that corresponds to the application that is associated with the second region of the display; and as a result of determining the first user intent is the handwriting intent, the first instance of pen input is intercepted, thereby preventing the application from receiving the first instance of pen input.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:

at least one processor; and memory storing instructions that, when executed by the at least one processor, cause the system to perform a set of operations, the set of operations comprising:

receiving pen input at a region of a display that includes a first target input field and a second target input field;

determining a user intent for the pen input includes a handwriting intent by evaluating the pen input using a machine learning model that is trained to classify pen input in relation to the first target input field and the second target input field;

as a result of determining the first user intent is the handwriting intent, intercepting the first instance of pen input, thereby preventing an application from receiving the first instance of pen input;

processing the pen input to determine whether the first target input field or the second target input field is intended for the pen input;

generating, based on the pen input, handwriting input; and providing, to the determined first target input field or the second target input field, the generated handwriting input.

2. The system of claim 1, wherein the first target input field is associated with a first application and the second target input field is associated with a second application.

3. The system of claim 1, wherein the set of operations comprises:

accessing a quirk library that stores application-specific input techniques affecting handwriting input behavior; and identifying, based on the quirk library, one or more quirks associated with the first application or the second application that modify how the pen input should be processed.

4. The system of claim 3, wherein the quirk library comprises one or more of:

a quirk obtained from a remote quirk repository;

a user-specified quirk; or a locally generated quirk.

5. The system of claim 1, wherein determining the user intent for the pen input comprises:

before the user intent is determined, displaying pre-determination graphical feedback; and after the user intent is determined, displaying post-determination graphical feedback.

6. The system of claim 1, wherein the handwriting input is generated based on a context of the determined first target input field or the second target input field.

7. The system of claim 1, wherein providing the generated handwriting input to the determined first target input field or the second target input field comprises:

determining an input technique from a set of input techniques associated with the determined first target input field or the second target input field; and providing the generated handwriting input to the determined first target input field or the second target input field using the determined input technique.

8. A method for processing digital handwriting input, the method comprising:

receiving pen input at a region of a display that includes a first target input field associated with a first application and a second target input field associated with a second application;

accessing a quirk library that stores application-specific input techniques affecting pen input behavior;

identifying, based on the quirk library, one or more quirks associated with the first application or the second application that modify how the pen input should be processed;

determining, using a machine learning model and based on the one or more quirks, a user intent for the pen input includes a handwriting intent;

processing the pen input to determine whether the first target input field or the second target input field is intended for the pen input;

generating, based on the pen input, handwriting input; and providing, to the determined first target input field or the second target input field, the generated handwriting input.

9. The method of claim 8, wherein the quirk library comprises one or more of:

a quirk obtained from a remote quirk repository;

a user-specified quirk; or a locally generated quirk.

10. The method of claim 8, wherein determining the user intent for the pen input comprises:

before the user intent is determined, displaying pre-determination graphical feedback; and after the user intent is determined, displaying post-determination graphical feedback.

11. The method of claim 8, wherein the handwriting input is generated based on a context of the determined first target input field or the second target input field.

12. The method of claim 8, wherein providing the generated handwriting input to the determined first target input field or the second target input field comprises:

determining an input technique from a set of input techniques associated with the determined first target input field or the second target input field; and providing the generated handwriting input to the determined first target input field or the second target input field using the determined input technique.

13. The method of claim 12, wherein the set of input techniques comprises one or more of:

a text services framework;

a user interface automation application programming interface; or simulated keyboard input.

14. A method for processing digital handwriting input, the method comprising:

receiving pen input at a region of a display that includes a first target input field and a second target input field;

determining a user intent for the pen input includes a handwriting intent by evaluating the pen input using a machine learning model that is trained to classify pen input in relation to the first target input field and the second target input field;

as a result of determining the first user intent is the handwriting intent, intercepting the first instance of pen input, thereby preventing an application from receiving the first instance of pen input;

processing the pen input to determine whether the first target input field or the second target input field is intended for the pen input;

generating, based on the pen input, handwriting input; and providing, to the determined first target input field or the second target input field, the generated handwriting input.

15. The method of claim 14, wherein the first target input field is associated with a first application and the second target input field is associated with a second application.

16. The method of claim 14, further comprising:

accessing a quirk library that stores application-specific input techniques affecting handwriting input behavior; and identifying, based on the quirk library, one or more quirks associated with the first application or the second application that modify how the pen input should be processed.

17. The method of claim 16, wherein the quirk library comprises one or more of:

a quirk obtained from a remote quirk repository;

a user-specified quirk; or a locally generated quirk.

18. The method of claim 14, wherein determining the user intent for the pen input comprises:

before the user intent is determined, displaying pre-determination graphical feedback; and after the user intent is determined, displaying post-determination graphical feedback.

19. The method of claim 14, wherein the handwriting input is generated based on a context of the determined first target input field or the second target input field.

20. The method of claim 14, wherein providing the generated handwriting input to the determined first target input field or the second target input field comprises:

determining an input technique from a set of input techniques associated with the determined first target input field or the second target input field; and providing the generated handwriting input to the determined first target input field or the second target input field using the determined input technique.

* * * * *